W. N. GOLDEN.
Feed-Steamer.
No. 220,282. Patented Oct. 7, 1879.
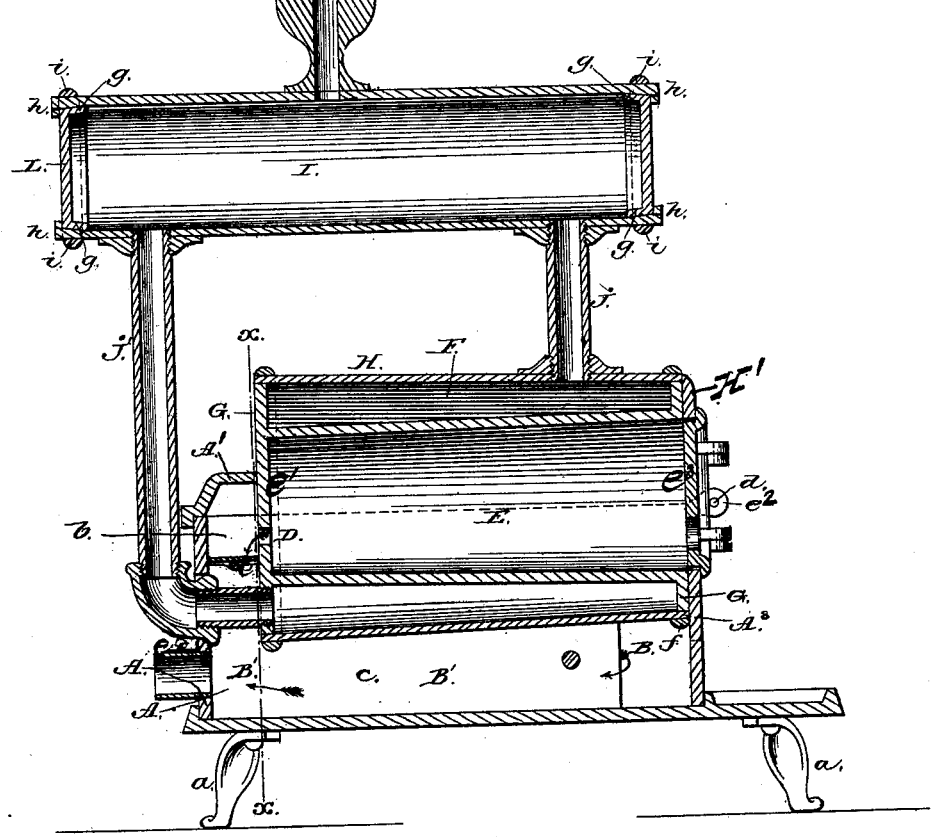
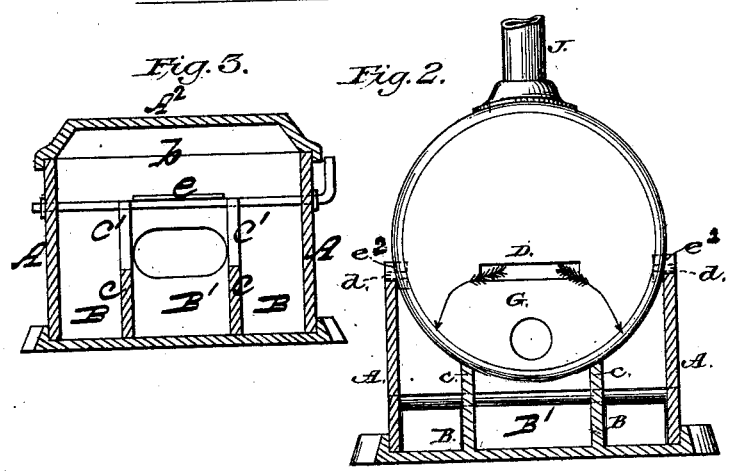
WITNESSES
John A. Lewis
D. T. Cowl
INVENTOR
Warren N. Golden
by J. McMaster
ATTORNEY.

UNITED STATES PATENT OFFICE.

WARREN N. GOLDEN, OF COLDWATER, MICHIGAN.

IMPROVEMENT IN FEED-STEAMERS.

Specification forming part of Letters Patent No. 220,282, dated October 7, 1879; application filed May 24, 1879.

*To all whom it may concern:*

Be it known that I, W. N. GOLDEN, of Coldwater, in the county of Branch and State of Michigan, have invented certain new and useful Improvements in Feed-Boilers; and I do hereby declare that the following is a full, clear, and exact description thereof, sufficient to enable others skilled in the art to which my invention appertains to make and use the same, reference being had to the accompanying drawings, and to the letters of reference marked thereon, and in which—

Figure 1 is a sectional elevation of my improved feed-steamer, and Fig. 2 is a section on line $x$ $x$ of Fig. 1. Fig. 3 is a rear sectional elevation, also taken on the line $x$ $x$ of Fig. 1, viewing the rear chamber of the boiler-jacket from the boiler.

This invention has relation to improvements in agricultural boilers—*i. e.*, such as are specially adapted for steaming food for cattle or stock, though applicable for other analogous purposes; and it consists of a chamber cast upon its exterior at the ends with circular flanges or heads, upon which is fitted or driven a tapering shell or casing, and of return heat-flues under the boiler, to which the heat is conducted from the heater through an aperture in the rear end of the heater, substantially as hereinafter more fully set forth.

In the accompanying drawings, A marks a jacket, within which the boiler is supported a short distance above the bottom of said jacket, preferably upon the partitions forming the return heat-flues. The jacket A is provided at its rear end with a rearward and an upward extension, A', whose interior forms a passage or flue, $b$. In the lower part of this extension is the smoke-exit opening $e^4$, fitted with a collar or flange for the attachment of the smoke stack or pipe thereto.

B B are two side return heat-flues, and B' is a central return smoke-flue underneath the boiler, which are formed by the longitudinal partitions $c$ $c$, preferably cast with the bottom of the jacket A, and serving, as above intimated, as supports for the boiler. The front ends of these partitions terminate a short distance from that end of the jacket to provide passages from the side flues, B, to the central flue, B', for the smoke. The rear ends of these partitions are extended upwardly, as at $c'$, to a point below the rear heat passage or aperture in the heater, as seen in Figs. 1 and 3.

$e$ is the damper, which is arranged to rest on the extensions C' of the flue-partitions $c$, but not to project beyond said extensions, which would interfere with the descent or downward passage of the volatile products of combustion escaping through the rear opening or aperture of the heater to the side return heat-flues.

E is the heater, which consists of a chamber with its forward end connected to the jacket A by a pin, $d$, and eye $e^2$ on each side thereof, while in its rear end, $e^1$, there is an elongated aperture or opening, D, for the passage of the heat or volatile products of combustion into the flue or passage $b$. The heat or volatile products of combustion will, after passing through the aperture D of the heater into the passage or flue $b$, be deflected by the damper $e$ in the direction indicated by the arrows in Figs. 1 and 2, which will cause it to pass down into the side flues, B B, through which it will be drawn, or pass to and through the passages at the forward end of the jacket into the central flue, B', directly under the boiler, thus reheating its contents. It will be drawn through the flue B', out through the smoke-exit opening $e^4$ into the stack, and the unconsumed portion with the smoke be carried off. When, as at the time of building the fire, a direct draft is desirable, this can be secured by simply presenting or turning the damper edgewise to the depth of the passage $b$, which will open up direct communication between the heat-passage D in the heater and the smoke-exit $e^4$.

The heater or chamber E is provided or cast at its ends with vertical circular flanges or heads G, of unequal depths, that at the rear end of the heater having the greatest circumference, as clearly shown in Fig. 1.

H is a shell or casing, tapering in longitudinal section toward its forward end, to accommodate which taper is the object of making the heads or flanges G on the heater of different sizes. The shell or casing, with its larger end presented to the smaller end of the heater, or rather the smaller flange, is driven upon the flanges or heads, and thus wedged thereon. The shape of the shell or casing with that of the flanges or heads conduces to wedge it in place. After this, bands $f$ may be shrunk, in the usual way, on the shell or casing H at its points of contact with the flanges, as seen in Fig. 1. The front H', with the attached door $e^3$, is now secured in place in the front end of the heater, with its upper end or flange fitting against the smaller or forward head and that end of the shell or casing, while its lower flange fits against the same end of the jacket A. The space F between the shell H and heater E constitutes the boiler-chamber.

I is a horizontal elevated water-tank, connected at one end to the upper side of the boiler by a pipe, $j$, and at the other end to the lower rear end of the boiler by a pipe, $j'$. The upper side of the tank I is provided with a pipe or nozzle, K. The heads L of the tank or cylinder I are provided with inwardly-projecting flanges $g$, which, previous to the insertion of the cylinder-heads, are slightly flaring. The cylinder of the tank is heated and shrunk on the heads L in its heated state being sufficiently expanded to receive the heads with their flared flanges, and when cooled or contracted binding upon the flared flanges. This method, as well as that for fastening the shell to the flanges on the heater in forming the boiler, obviates, as is well known, the use of bolts to fasten the respective parts together to render the heads steam-tight and proof against being blown out.

$i\ i$ are rings or bands, which may be shrunk on the cylinder I at its ends, and $h\ h$ are also rings inserted within the end flanges of the cylinder against the cylinder-heads, to further strengthen these points. The boiler and tank are both filled with water through the pipe or nozzle K, after which the pipe or hose leading to the receptacle containing the food to be steamed or cooked is fitted to or on this nozzle, and steam generated in the boiler by the heater E. The steam will pass up through the pipe $j$ into the combined water-tank and supplemental boiler I, and out through its nozzle and the hose-pipe into the food-receptacle, which can be kept up until the food is properly steamed or cooked. The cold currents of water will, of course, pass down through the pipe $j'$ into the bottom of the boiler, and thus keep up a continuous circulation of and heat all the water, while at the same time the tank will thus serve as a feed-water tank. When its water has been exhausted, the steam, in a measure, in the boiler F may be blown by the usual blow-off cock or cocks, the hose-pipe be disconnected from the nozzle K, and the tank be again filled with water.

Having thus fully described my invention, I claim and desire to secure by Letters Patent—

1. In an agricultural boiler, the combination, with the chamber E, provided or cast at its ends with different-sized circular flanges or heads G, of the tapering shell or casing H, driven on said heads or flanges G, substantially as specified.

2. In combination with the heater E, having the surrounding steam-chamber F, and provided with the rear heat-opening, D, the jacket A, provided with the rear passage, $b$, having the damper $e$, and the side and central return-flues B B', substantially as and for the purpose set forth.

In testimony whereof I hereto affix my signature in presence of two witnesses.

W. N. GOLDEN.

Witnesses:
H. J. ENNIS,
H. CLAY SMITH.